Nov. 2, 1965   C. R. McCULLOCH   3,215,970
SIDE PULLAWAY DISCONNECT APPARATUS
Filed Sept. 10, 1963   3 Sheets-Sheet 1
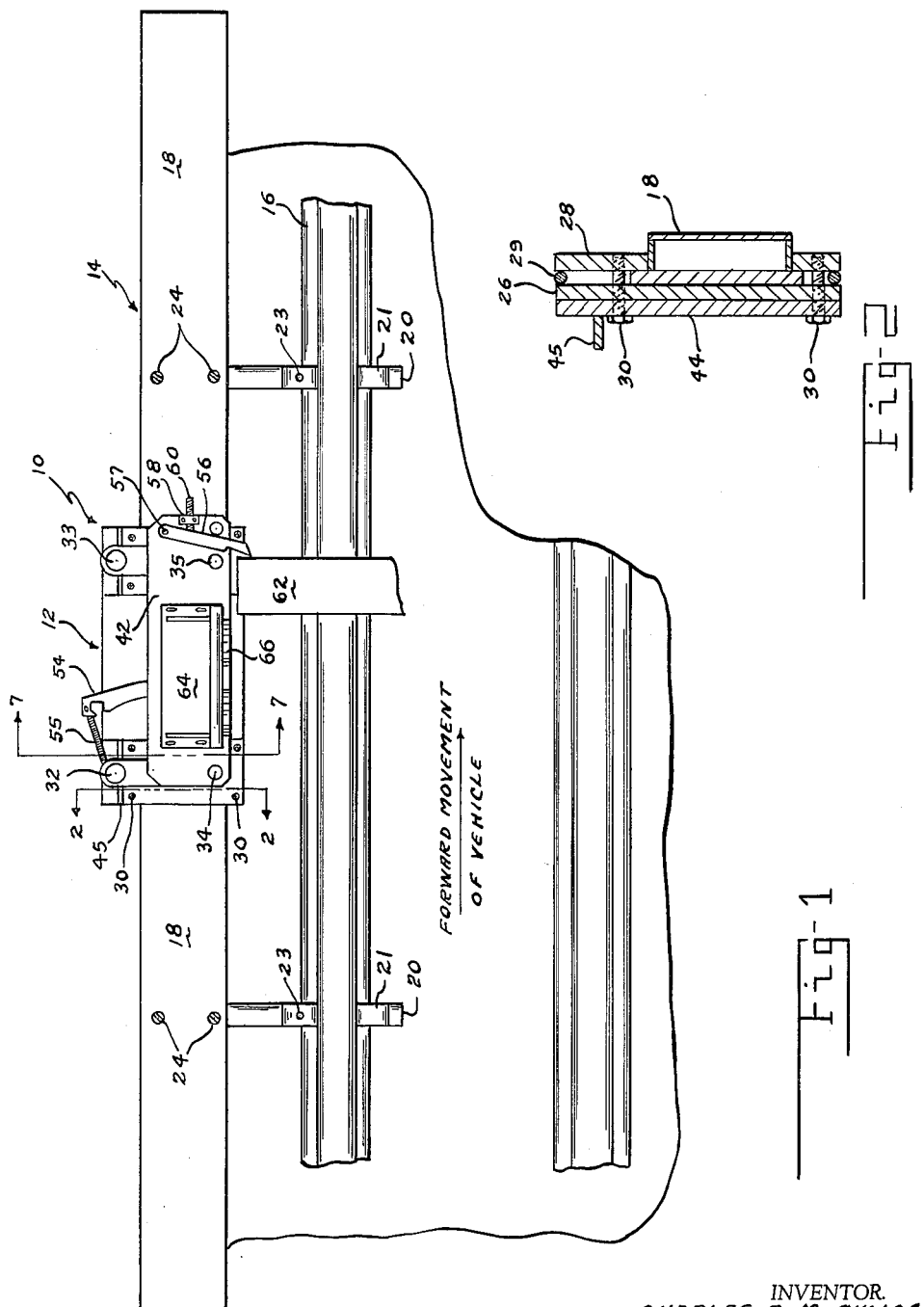
INVENTOR.
CHARLES R. McCULLOCH
BY
ATTORNEYS

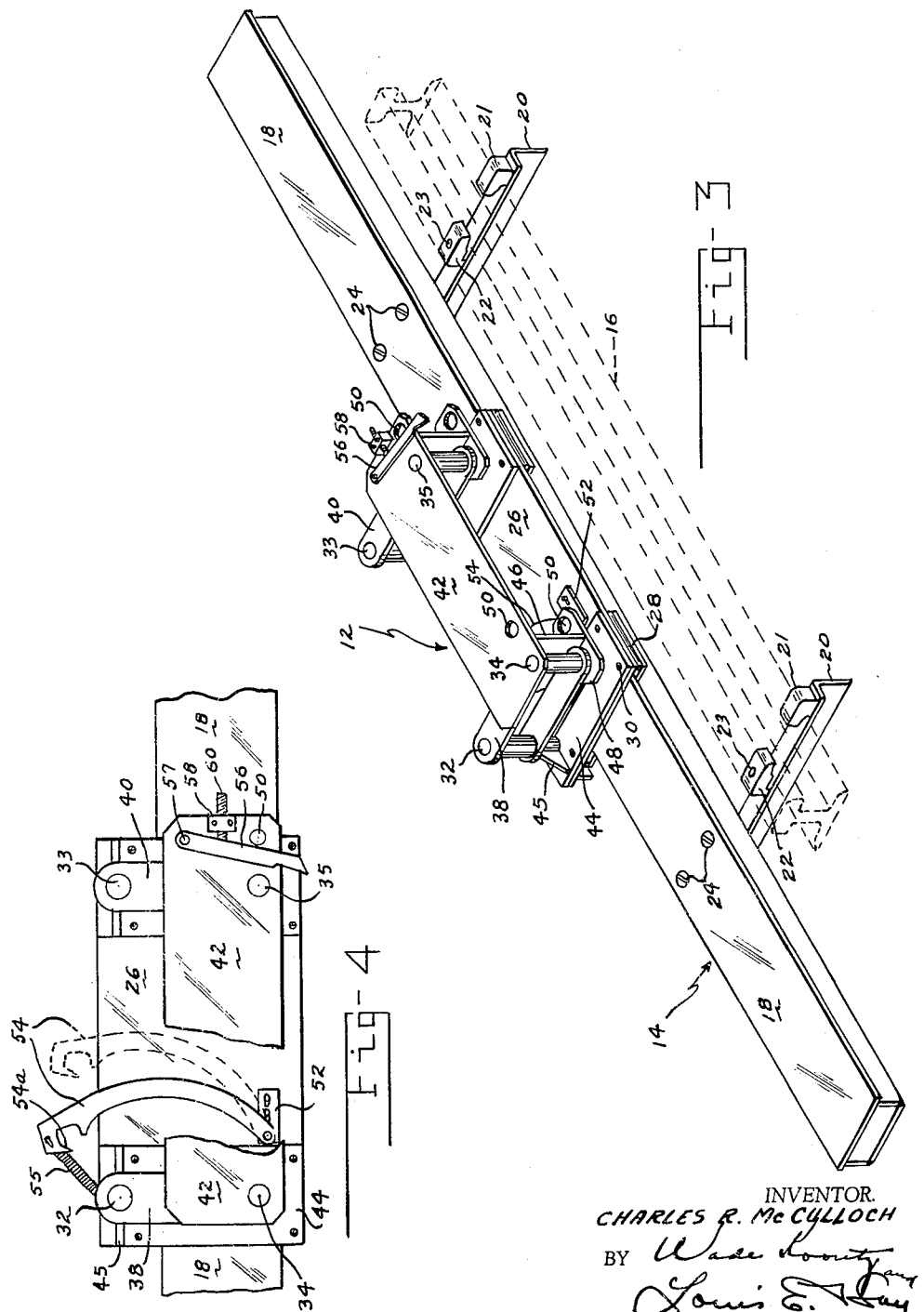

Nov. 2, 1965   C. R. McCULLOCH   3,215,970
SIDE PULLAWAY DISCONNECT APPARATUS
Filed Sept. 10, 1963   3 Sheets-Sheet 3
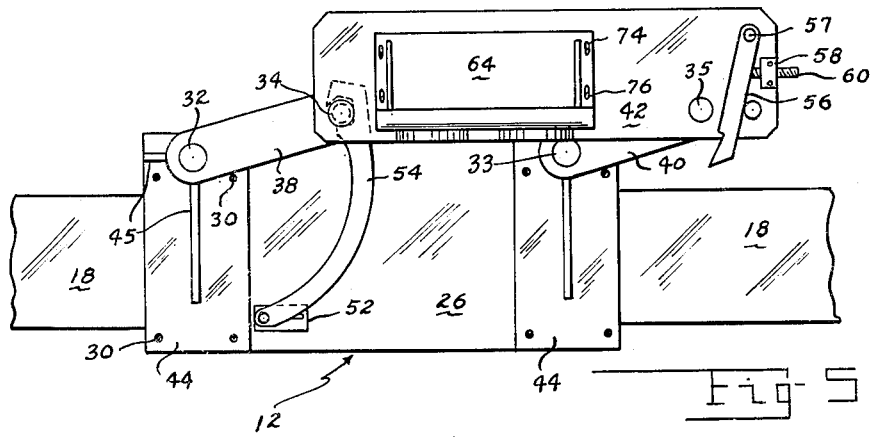
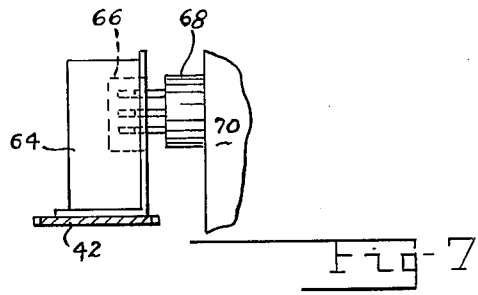
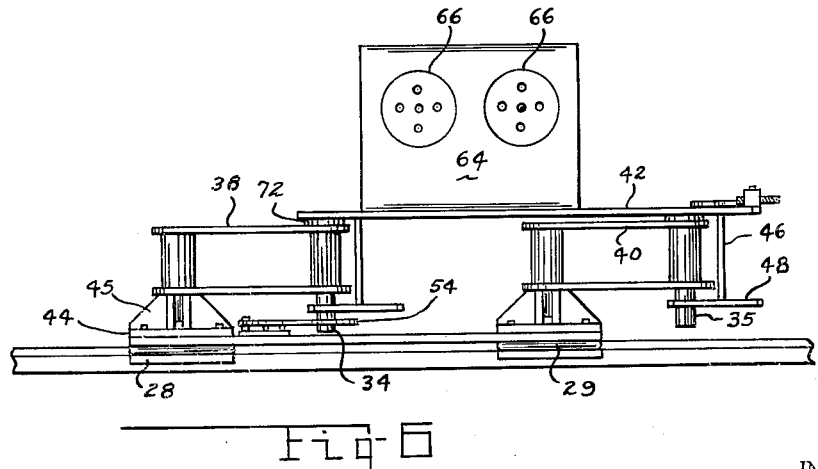
INVENTOR.
CHARLES R. McCULLOCH

United States Patent Office 3,215,970
Patented Nov. 2, 1965

3,215,970
SIDE PULLAWAY DISCONNECT APPARATUS
Charles R. McCulloch, Alamogordo, N. Mex., assignor to the United States of America as represented by the Secretary of the Air Force
Filed Sept. 10, 1963, Ser. No. 308,037
5 Claims. (Cl. 339—45)
(Granted under Title 35, U.S. Code (1952), sec. 266)

The invention described herein may be manufactured and used by or for the Gorvernment for governmental purposes without the payment to me of any royalty thereon.

This invention relates to quick-disconnect apparatus such as used to disconnect or disengage electrical plugs or quick-disconnect hose couplings. More specifically, this invention relates to disconnect apparatus which disconnect plugs in a direction transverse to the direction of movement of the object or vehicle to which one of the mating plug elements is attached.

Though not limited to such a vehicle, this invention is extremely useful on a rocket sled such as is used to conduct high velocity and high acceleration-deceleration tests of hardware relating to flight. Such rocket sleds are also used to determine the effect of acceleration and deceleration on living beings and to test protective and safety devices.

A rocket sled, as the name implies, is normally accelerated by a rocket engine, and glides on a dual rail track which is similar to a railroad track. Such a sled stands stationary at the starting point, where it is fueled, instrumented and fitted for the next test run. Numerous circuits connect various elements on the sled with fixed elements at the control center at the track site. These circuits, such as for example, firing circuits must be severed or disengaged as the sled commences moving after a fire-up of the rocket engine. The circuits, which are to be severed, normally contain quick-disconnect plugs which may be axially pulled apart. The plugs are preferably at the side of the rocket sled instead of at the rear where the wiring harnesses would be exposed to the intense heat of the exhaust gases from the rocket engine. Placing the disconnect plugs at the side of the sled, where they must be disengaged with a motion transverse to the forward motion of the sled, creates a disconnect problem toward which this invention is directed.

One object of this invention is to provide a side pullaway apparatus which will disengage with a motion transverse to the motion of the vehicle from which disengagement is to be made.

Another object of this invention is to provide a side pullaway apparatus which is rugged and is nonsensitive to the severe operational environment in which rocket sleds are operated.

A further object of this invention is to provide a side pullaway disconnect which is readily adjustable in three dimensions.

Yet another object of this invention is to provide a side pullaway disconnect apparatus having no delicate elements and which has extreme simplicity of manufacture and operation.

Additional objects, advantages and features of the invention reside in the construction, arrangement and combination of parts involved in the embodiment of the invention as will appear from the following description and accompanying drawings, wherein:

FIG. 1 is a plan view of the side pullaway disconnect apparatus adjacently joined in proper position to one of the rails of the track on which the rocket sled operates.

FIG. 2 is an enlarged vertical section along line 2—2 on FIG. 1 and showing in particular the clamping arrangement for holding the device at any selected position alongside the track.

FIG. 3 is a perspective of the apparatus showing the general arrangement of elements and the method for attaching to the track.

FIG. 4 is an enlarged plan view of a portion of the apparatus in connect position, partially broken to show the catch arm in its two extreme positions.

FIG. 5 is a plan view similar to FIG. 4 and showing the device in the disengaged position where it is held in place by the catch arm.

FIG. 6 is an elevation of FIG. 5 showing the arrangement of elements in the disengaged position, and FIG. 7 is an enlarged partial section along line 7—7 of FIG. 1 rotated 90°, and showing the male plug element of an electrical quick-disconnect plug joined to a fragmentary portion of the rocket sled and partially disengaged from the companion female plug element joined to the side pullaway disconnect apparatus.

Referring to FIG. 1, the side pullaway disconnect apparatus, to be referred to as apparatus 10, comprises an actuating assembly 12 slidable on a beam assembly 14 which is joined to a rail 16 of the two rail track on which the rocket sled (not shown) is operated. It is to be assumed that the rocket sled is accelerated in the direction indicated by the arrow between the rails of the track.

Referring now in particular to FIG. 3, the beam assembly 14 has an elongated horizontal guide plate 18, which may conveniently be made of a welded box structure as shown; and to which is joined at the lower face, at least two extending arms 20. The arms 20 pass underneath rail 16 and join the beam assembly thereto by means of toe clamps 21 welded to the end of each arm, and toe clamps 22 detachably held in place by screws 23. The beam assembly is joined in such manner that the upper face of the guide plate 18 is parallel to rail 16 both in elevation and in side-by-side relationship. Arms 20 may be joined to guide plate 18 by welding, or by means of flat head screws 24 as shown. The upper member of guide plate 18 extends on both sides of the side members as shown, and provides the supporting element on which the actuating assembly 12 may be longitudinally located and clamped in place.

As shown, for example on FIG. 3 and FIG. 5, the actuating assembly 12 has a base plate 26 which provides the supporting base for the other elements of the actuating assembly. The base plate rests upon and is longitudinally slidable on guide plate 18. As best shown on FIG. 2 and FIG. 3, the actuating assembly is longitudinally located and clamped in place on the guide plate 18 by a plurality of clamping members 28 which engage the lower surface of the extending upper member of the guide plate. A suitable heel on each clamp is provided by longitudinally welding in place, a suitable length of rod 29 as best shown on FIG. 2. The clamps may be loosened or tightened by means of cap screws 30 which extend through the actuating assembly and threadably engage the clamping members 28.

The actuating assembly is, expressed in its most simple terms, a parallelogram structure having two fixed pivot pins joined to the base plate 26 to be parallel to the motion of the vehicle on the track, and forming two adjacent corners of the parallelogram structure, and two swing pins for arcuate horizontal motion about the fixed pivot pins and forming the two opposite and adjacent corners of the parallelogram structure. The action of the parallelogram structure can be best shown by reference to FIG. 4 and FIG. 5 in which pins 32 and 33 are the fixed pins joined to the base plate so as to remain in fixed relationship to each other, and pins 34 and 35 are the movable swing pins which are horizontally and arcuately movable about the fixed pins. Pins 32 and 34 are joined by an elongated link 38 and pins 33 and 35 are joined by a similar elongated link 40. Pins 34 and 35 are also joined by an elongated platform 42 which is superimposed to be slidably supported by links 38 and 40. FIG. 4 shows the actuating assembly in one extreme position in which the pins are so located as to form a rectangular parallelogram, while FIG. 5 shows the second extreme position in which the links have been arcuately rotated about the fixed pivot pins 32 and 33 to displace platform 42 in both a longitudinal and a lateral direction. As will be hereinafter explained, FIG. 1, FIG. 3 and FIG. 4 show the actuating assembly in the connected position and FIG. 5 shows the actuating assembly in the disengaged position.

As shown on FIG. 5 and FIG. 6, pins 32 and 33 may be welded to sub-structures 44 and braced with gussets 45. The upper portions of the gussets are machined to a plane surface perpendicular to the axis of each pin to provide bearing surfaces for supporting the links 38 and 40. The sub-structures 44 may be joined to base plate 26 by means of cap screws 30 as shown on FIG. 2. If desired, the pins and gussets may be directly joined to base 26. As best shown on FIG. 6, the elongated links 38 and 40 may conveniently be made of weldments comprising of flat side pieces joined to tubes bored to proper diameter to slidably engage the pins. The bores in the tubes must be parallel to each other and the axes of the bores in one link must be of equal distance to the axes of the bores in the other link.

As best shown on FIG. 3 and FIG. 6, the elongated platform 42, near each end, has a downward extending gusset 46 welded to the lower face of the platform. Welded to the lower edge of each gusset 46, so as to be parallel with platform 42 is a hinge support 48. As best shown on FIG. 3, each end of platform 42 and hinge support 48 is bored at two places with coaxial bores 50 adjacent to one of the elongated edges on the platform, to form alternate positions for pins 34 and 35. The diameter of the bores 50 are the same diameter as the bores in links 38 and 40 which engage pins 34 and 35. The left bore at each end of platform 42, shown in engagement with pins 34 and 35, constitute one pair of bores; and the open bores constitute the second pair or alternate position for the pins. The axes of each pair of coaxial bores 50 are to be equal distant to the axes of the fixed pins 32 and 33 on base 26. The purpose of the alternate positions for swing pins 34 and 35 will be explained hereinafter.

Swing pins 34 and 35, which are axially slidable and pivotally join platform 42 to links 38 and 40, are preferably made to be flush with the top face of platform 42. This may be done by several methods well known to the art, such as for example: using a thin head on each pin which nests in a counterbore in the upper end of bore 50 in platform 42, or, retaining each pin in its companion link by means of a set screw. It is imperative, however, that the upper ends of fixed pins 32 and 33 do not protrude through the upper faces of links 38 and 40, in order that they do not interfere with the free transition of the platform from the position shown on FIG. 4 to the position shown on FIG. 5.

Removably attached to the upper face of the base plate 26, as best shown on FIG. 4, is block 52 which pivotally supports one end of catch arm 54 which has a hook 54a on the free end as shown. A tension spring 55, having one end hooked to the catch arm and the other end to any convenient nonmoving portion of the device, biases the hook end of the catch arm in a counter-clockwise direction. The extreme position of the catch arm during operation of the device is indicated by the phantom lines. As best shown on FIG. 6, swing pin 34 extends downward enough to engage the catch arm as link 38 is pivotally moved from the position of FIG. 4 to the position of FIG. 5. The end of the pin engages the curved catch arm and moves it against the biasing force of the spring until the device assumes the position of FIG. 5, at which time the hook on the catch arm engages the end of the pin to hold the device in that position until manually released.

Referring now to FIG. 1, the motivation of the device will be explained. An actuating arm 56 is pivotally joined at one end to the upper face of platform 42 by pin 57 in a position permitting the opposite end of the arm to extend out from the edge of the platform. A block 58 is attached to platform 42, and has an adjusting screw 60 passing therethrough. The screw 60 engages the edge of the actuating arm 56 and controls the position of the arm. The rocket sled (not shown), which is operable on the track, has a slipper 62 extending from the side for engaging the actuating arm as shown. As the rocket sled moves forward, in the direction of the arrow, it is obvious that platform 42 will be carried forward, and that the platform 42 will pivot on swing pins 34 and 35, while links 38 and 40 pivot on fixed pins 32 and 33. A point is soon reached where the end of the actuating arm will become disengaged from the slipper on the sled; however, the rate of the acceleration of the sled is tremendous, and the momentum of the moving parts of the device is sufficient to move the platform and links to the disengaged position shown on FIG. 5.

The apparatus 10 may be used to disengage any quick-disconnect device actuated with a straight line motion. Such devices may be electrical, pneumatic or hydraulic, used singly or in combination. For the sake of simplicity, the device is shown with two electrical quick-disconnects using conventional straight pins in one plug half and sockets in the companion plug half. One plug half of each quick-disconnect may be supported by any convenient means on the apparatus 10 while the other plug half of each quick-disconnect is supported on the rocket sled.

Referring to FIG. 1 and FIG. 7, any convenient bracket, such as angle bracket 64, is mounted on platform 42. The female plug halves 66 are shown in supported position on angle bracket 64. As shown on FIG. 7, the male plug halves 68 are attached to the rocket sled 70 (shown only in fragment). For clarity, the plugs are shown only partially connected in FIG. 7.

In order to make proper engagement, the relationship of the plug halves must be adjusted, one to the other. The vertical adjustment may be made by means of washer shims 72 placed over pins 34 and 35, as shown on FIG. 6, to control the vertical spacing of the platform 42 in relationship to the fixed elevation of links 38 and 40. As an alternative, shims (not shown) may be placed between angle bracket 64 and platform 42. The longitudinal engagement of the pins into the sockets may be controlled by means of elongated slots 74 in the base of angle bracket 64, as shown on FIG. 5. The slots 74 permit shifting the bracket 64 on the hold down screws 76 in a manner well known to the art.

Connection with the rocket sled may be made by halting the sled adjacent to the beam assembly 14 shown on FIG. 1. Cap screws 30 are then loosened to permit sliding the actuating assembly 12 on the beam assembly 14 into proper position for connecting the quick-disconnect plugs, after which the cap screws are re-tightened. The adjusting screw 60 is then adjusted to remove all slack between the actuating arm 56 and the slipper 62 on the rocket sled.

From the parallelogram construction of the apparatus, it is obvious that as the sled moves forward on the track, the platform 42 will also move forward a corresponding amount, while at the same time moving transversely to the vehicle, because of the action of the links 38 and 40 on pins 32 and 33. It is thus seen that the pins in the electrical quick-disconnect plugs do not shear because of the corresponding forward motion of the sled and platform 42 of the actuating assembly; while the lateral motion of the platform away from the sled produces the actual disengagement. The side pullaway disconnect apparatus has been found to have utmost reliability for the application described, having been used on many test runs of the rocket sled without malfunction.

As shown on FIG. 1, the side pullaway disconnect apparatus is shown in use on the left side of the rocket sled. The device may also be used on the right side of the sled by attaching the beam assembly 14 onto the opposite rail, moving the front end of links 38 and 40 and swing pins 34 and 35 to their alternate bores 50, reversing catch arm 54 and moving block 52 to its alternate position in the corresponding place on the right end of base plate 26 (not shown), and moving actuating arm 56 and adjusting screw 60 to their like alternate position on the other side of platform 42 (not shown).

It is to be understood that the embodiment of the present invention as shown and described is to be regarded as illustrative only and that the invention is susceptible to variations, modifications and changes within the scope of the appended claims.

I claim:

1. An apparatus for disengaging one or more quick-disconnect devices from a moving vehicle transverse to the foreward movement of said vehicle, one element of each quick-disconnect device being joined to said vehicle and the companion element of each quick-disconnect device being mounted on said apparatus comprising: a base, two fixed pins vertically extending from said base to be parallel with the forward movement of said vehicle, two links each pivotally supported at one end by one of said fixed pins for horizontal movement about said fixed pin, a swing pin at the opposite end on each of said links and extending upward from said link, a platform for supporting the companion element of each quick-disconnect device superimposed over said links and pivotally joined to said swing pins in such positions that the distance between the axes of said swing pins is the same as the distance between the axes of said fixed pins to provide a parallelogram structure pivotable on said fixed pins with the axes of of said fixed and said swing pins at the corners of the parallelogram, the parallelogram structure so formed being nearest to the side of said vehicle in a transverse direction when the said pins are positioned to form a right angle parallelogram at which time the quick-disconnect devices are engaged, and means joined to said parallelogram structure for releasably engaging said vehicle during the initial forward motion of said vehicle to pivot the parallelogram structure about said fixed pins and move said platform forward with and transversely away from said vehicle to disengage said quick-disconnect devices.

2. An apparatus for disengaging one or more quick-disconnect devices from a moving vehicle transverse to the forward movement of said vehicle, one element of each quick-disconnect device being joined to said vehicle and the companion element of each quick-disconnect device being mounted on said apparatus comprising: an actuating assembly and a beam assembly having an elongated horizontal guide plate slidably supporting said actuating assembly to be parallel to the forward motion of said vehicle; said actuating assembly comprising a base supported on said beam assembly, two fixed pins vertically extending from said base to be parallel with the forward movement of said vehicle, two links each pivotally supported at one end by one of said fixed pins for horizontal movement about said fixed pin, a swing pin at the opposite end on each of said links and extending upward from said link, a platform for supporting the companion element of each quick-disconnect device superimposed over said links and pivotally joined to said swing pins in such positions that the distance between the axes of said swing pins is the same as the distance between the axes of said fixed pins to provide a parallelogram structure pivotable on said fixed pins with the axes of said fixed and swing pins at the corners of the parallelogram, the parallelogram structures so formed being nearest to the side of said vehicle in a transverse direction when the said pins are positioned to form a right angle parallelogram at which time the quick-disconnect devices are engaged, means joined to said platform for releasably engaging said vehicle during the initial forward motion of said vehicle to pivot the parallelogram structure about said fixed pins and move said platform forward with and transversely away from said vehicle to disengage said quick-disconnect devices, and holding means joined to said base and engaging with and releasably holding said parallelogram structure in the disengaged position.

3. An apparatus for disengaging one or more quick-disconnect devices from a moving vehicle transverse to the forward movement of said vehicle operating on a track, one element of each quick-disconnect device being joined to said vehicle and the companion element of each quick-disconnect device being mounted on said apparatus comprising: an actuating assembly and a beam assembly slidably supporting said actuating assembly to be parallel to the forwrd motion of said vehicle; said beam assembly having an elongated horizontal guide plate slidably supporting said actuating assembly and having means extending therefrom for attaching said beam assembly to said track to position said guide plate parallel to said track; said acuating assembly comprising a base slidably supported on the elongated guide plate of said beam assembly, means joined to said base for releasably clamping said base to said beam assembly, two fixed pins vertically extending from said base to be parallel with the forward movement of said vehicle, two links each pivotally supported at one end by one of said fixed pins for horizontal movement about said fixed pin, a swing pin at the opposite end on each of said links and extending upward from said link, a platform for supporting the companion element of each quick-disconnect device superimposed over said links and pivotally joined to said swing pins in such positions that the distance between the axes of said swing pins is the same as the distance between the axes of said fixed pins to provide a parallelogram structure pivotable on said fixed pins with the axes of said fixed and said swing pins at the corners of the parallelogram, the parallelogram structure so formed being nearest to the side of said vehicle in a transverse direction when the said pins are positioned to form a right angle parallelogram at which time the quick-disconnect devices are engaged, an actuating arm joined to said platform for releasably engaging said vehicle during the initial forward motion of said vehicle to pivot the parallelogram structure about said fixed pins and move said platform forward with and transversely away from said vehicle to disengage said quick-disconnect devices, and a catch arm joined to said base and engaging with and releasably holding said parallelogram structure in the disengaged position.

4. An apparatus for disengaging one or more quick-disconnect devices from a moving vehicle transverse to the forward movement of said vehicle operating on a track, one element of each quick-disconnect device being joined to said vehicle and the companion element of each quick-disconnect device being mounted on said apparatus comprising: an actuating assembly and a beam assembly slidably supporting said actuating assembly to be parallel to the forward motion of said vehicle; said beam assembly having an elongated horizontal guide plate, two or more arms extending from said horizontal guide plate, clamping means joined to the free end of the arms for attaching said beam assembly to one rail of said track to position the elongated guide plate adjacent to and parallel with said track; said actuating assembly comprising a base slidably supported on the elongated guide plate of said beam assembly for movement parallel to said track, means joined to said base for releasably clamping said base to the elongated guide plate of said beam assembly at any selected longitudinal position, two fixed pins vertically extending from said base to be parallel with the forward movement of said vehicle, two links each pivotally supported at one end by one of said fixed pins for horizontal movement about said fixed pin, a swing pin at the opposite end on each of said links parallel to said fixed pin and located to have the axis of each swing pin equal distant from the axis of the fixed pin at the opposite end of said link, both of said swing pins having an end extending upward from said links and at least one of said swing pins also having an end extending downward from said links; a platform for supporting the companion element of each quick-disconnect device superimposed over said links and pivotally joined to said swing pins in such positions that the distance between the axes of said swing pins is the same as the distance between the axes of said fixed pins to provide a parallelogram structure pivotable on said fixed pins with the axes of said fixed and said swing pins at the corners of the parallelogram, the parallelogram structure so formed being nearest to the side of said vehicle in a transverse direction when the said pins are positioned to form a right angle parallelogram at which time the quick-disconnect devices are engaged, an actuating arm joined to said platform for releasably engaging said vehicle during the initial forward motion of said vehicle to pivot the parallelogram structure about said fixed pins and move said platform forward with and transversely away from said vehicle to disengage said quick-disconnect devices, a catch arm pivotally joined at one end to said base and having a hook at the opposite end for engaging with the downward extending end on one of said swing pins and releasably holding said parallelogram structure in the disengaged position, and a biasing means joined to said catch arm and biasing said catch arm into the engaging direction of movement.

5. An apparatus for disengaging one or more quick-disconnect devices from a moving vehicle transverse to the forward movement of said vehicle operating on a track, one element of each quick-disconnect device being joined to said vehicle and the companion element of each quick-disconnect device being mounted on said apparatus comprising: an actuating assembly and a beam assembly slidably supporting said actuating assembly to be parallel to the forward motion of said vehicle; said beam assembly having an elongated horizontal guide plate, two or more arms extending from said horizontal guide plate for passing underneath one rail of said track, clamping means joined to the free end of said arms for clamping said beam assembly to said rail at any selected position to locate the elongated guide plate adjacent to and parallel with said track; said actuating assembly comprising a base slidably supported on the elongated guide plate of said beam assembly for movement parallel to said track, means joined to said base for releasably clamping said base to the elongated guide plate of said beam assembly at any selected longitudinal position, two fixed pins vertically extending from said base to be parallel with the forward movement of said vehicle, two elongated links each having a bore therethrough at one end parallel to a similar bore at the other end, the axes of the bores on one link being equal distant to the axes of the bores on the other link, one bore of each link engaging one of said fixed pins for horizontal pivotal movement about said fixed pin; an elongated platform superimposed for support on said links and having adjacent to one long edge thereof two bores the axes of which are equal distant to the axes of said fixed pins, two swing pins each axially slidable in one of the bores in said platform and the bore in one of said links and pivotally joining said platform to said links, at least one of said swing pins extending below the lower surface of the link engaged; said fixed pins, said links, said platform and said swing pins forming a parallelogram structure pivotable on said fixed pins with the axes of said fixed pins and said swing pins at the corners of the parallelogram, the parallelogram structure so formed being nearest to the side of said vehicle in a transverse direction when the said pins are positioned to form a right angle parallelogram at which time the quick-disconnect devices are engaged, a bracket joined to said platform and supporting the companion element of each quick-disconnect device, an actuating arm joined to said platform for releasably engaging said vehicle during the initial forward motion of said vehicle to pivot the parallelogram structure about said fixed pins and move said platform forward with and transversely away from said vehicle to disengage said quick-disconnect devices, a catch arm pivotally joined at one end of said base and having a hook at the opposite end for engaging with the downward extending end on one of said swing pins and releasably holding said parallelogram structure in the disengaged position, and a tension spring having one end joined to said catch arm and biasing said catch arm into the engaging direction of movement.

References Cited by the Examiner
UNITED STATES PATENTS 2,997,682    8/61    Grimes et al. _____ 339—45 X
3,129,046    4/64    Morris _____ 339—35

JOSEPH D. SEERS, *Primary Examiner.*